US009318235B2

(12) United States Patent
Sato

(10) Patent No.: US 9,318,235 B2
(45) Date of Patent: Apr. 19, 2016

(54) FILM PEELING METHOD AND FILM PEELING DEVICE FOR FILM-COATED FLAT WIRE

(71) Applicant: Kazuhiro Sato, Toyota (JP)

(72) Inventor: Kazuhiro Sato, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/029,149

(22) Filed: Sep. 17, 2013

(65) Prior Publication Data

US 2014/0076498 A1    Mar. 20, 2014

(30) Foreign Application Priority Data

Sep. 18, 2012   (JP) ................................. 2012-204533

(51) Int. Cl.
   *B32B 38/10*     (2006.01)
   *H01B 5/04*      (2006.01)
   *H02G 1/12*      (2006.01)
   *B32B 43/00*     (2006.01)

(52) U.S. Cl.
   CPC ............ *H01B 5/04* (2013.01); *H02G 1/1268* (2013.01); *B32B 38/10* (2013.01); *B32B 43/006* (2013.01); *H02G 1/1295* (2013.01); *Y10T 156/11* (2015.01); *Y10T 156/1184* (2015.01); *Y10T 156/1189* (2015.01); *Y10T 156/1961* (2015.01); *Y10T 156/1967* (2015.01); *Y10T 156/1972* (2015.01)

(58) Field of Classification Search
   CPC  B32B 38/10; B32B 43/006; Y10T 156/1184; Y10T 156/1189; Y10T 156/1961; Y10T 156/1967; Y10T 156/1972
   See application file for complete search history.

(56) References Cited

U.S. PATENT DOCUMENTS

| 3,551,586 | A | * | 12/1970 | Dembiak et al. | ............... | 174/107 |
| 4,046,298 | A | * | 9/1977 | Schroeder, Jr. | .................... | 225/2 |
| 5,524,166 | A | * | 6/1996 | Osaka et al. | .................. | 385/134 |
| 5,577,150 | A | * | 11/1996 | Holder et al. | ................. | 385/134 |
| 6,754,416 | B1 | * | 6/2004 | Mitchell et al. | ................. | 385/37 |
| 7,860,364 | B2 | * | 12/2010 | Mullaney et al. | ............. | 385/136 |
| 8,052,836 | B2 | * | 11/2011 | Cale et al. | ..................... | 156/712 |
| 2002/0124410 | A1 | * | 9/2002 | Tarpill | ................. | H02G 1/1226 30/90.1 |
| 2010/0126665 | A1 | * | 5/2010 | Cale | ................... | B23K 26/0621 156/272.8 |

FOREIGN PATENT DOCUMENTS

| JP | 5111731 | A | 5/1993 |
| JP | 2007189857 | A | 7/2007 |
| JP | 4616131 | B2 | 10/2010 |
| JP | 2011182597 | A | 9/2011 |
| JP | 2011250597 | A | 12/2011 |

* cited by examiner

*Primary Examiner* — Philip Tucker
*Assistant Examiner* — Nickolas Harm
(74) *Attorney, Agent, or Firm* — Kenyon & Kenyon LLP

(57) ABSTRACT

A film peeling method for a film-coated flat wire that is performed by a film peeling device including: a rotational holder that can rotationally convey in a perpendicular direction to a rotational axis; a positioning mechanism that positions a film-coated flat wire in a longitudinal direction; and a working section that is provided in plural, aligned at specified intervals, and works an end portion of the film-coated flat wire, the method includes: holding the film-coated flat wire that is cut in a specified length in advance by the rotational holder; rotationally conveying the film-coated flat wire that is held by the rotational holder in the perpendicular direction to the rotational axis; positioning the conveyed film-coated flat wire by the positioning mechanism; and working the end portion of the film-coated flat wire by the working section.

4 Claims, 17 Drawing Sheets

F I G . 13A
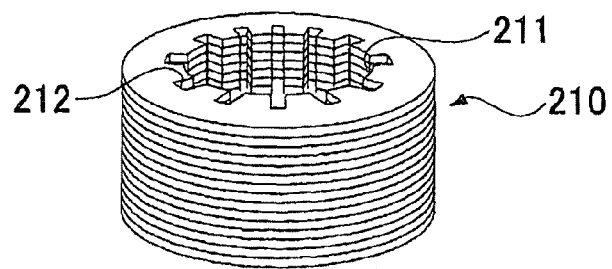
F I G . 13B 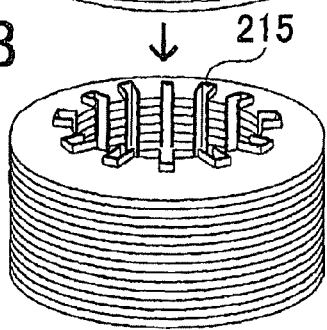  F I G . 13C 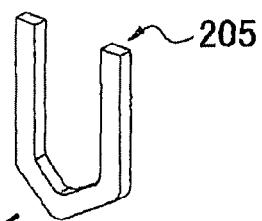
F I G . 13D 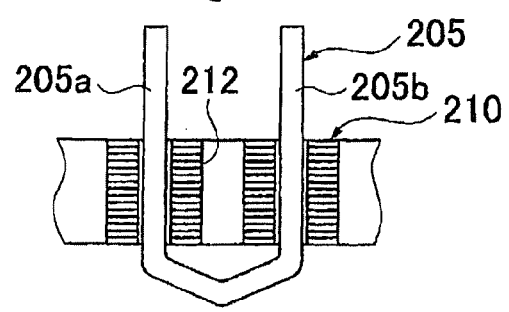
F I G . 13E 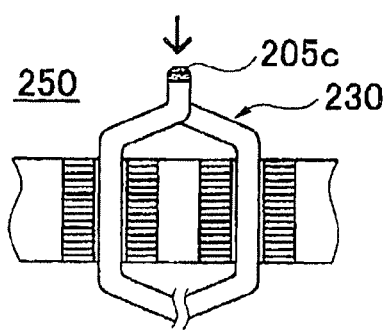

FILM PEELING METHOD AND FILM PEELING DEVICE FOR FILM-COATED FLAT WIRE

INCORPORATION BY REFERENCE

The disclosure of Japanese Patent Application No. 2012-204533 filed on Sep. 18, 2012 including the specification, drawings and abstract is incorporated herein by reference in its entirety.

BACKGROUND OF THE INVENTION

1. Field of the Invention

The present invention relates to a manufacturing method and a manufacturing device of a motor coil to be used in an automobile and the like, and particularly relates to a technique for efficiently peeling a film on a tip portion of a flat conductor.

2. Description of Related Art

In recent years, automobiles that use a motor as a drive source, such as hybrid vehicles and electric vehicles, have been developed. In order to use the motor as the drive source of the automobiles, high efficiency and downsizing of the motor have been desired. Such a demand for downsizing of the motor is especially high for the hybrid vehicles because an engine, the motor, and motor auxiliaries have to be installed in an engine room. Meanwhile, further efficiency of the motor has been desired to improve fuel economy of automobiles. In order to accomplish these objectives, it has been considered to adopt a flat conductor as a coil to be used in the motor. Although the flat conductor is coated with an insulating film, in order to form the coil into a circuit, the film has to be peeled partially to join the coils to one another.

Japanese Patent Application Publication No. 05-111731 (JP 05-111731 A) discloses a technique that pertains to a device for peeling and cutting a film of a flat wire. After the plural flat wires are unwound from plural material bobbins and layered, they are conveyed together to a peeling means. Then, surfaces of the flat wires are peeled by a first peeling machine each time the flat wires of a specified length pass. Next, the layered wires are separated by a separator for parallel alignment, and coatings in a parallel direction are further peeled by a second peeling machine per specified length. The wires having peeled portions as end portions are continuously cut into a specified length by a cutting mechanism.

Japanese Patent Application Publication No. 2011-250597 (JP 2011-250597 A) discloses a technique that pertains to a peeling device for a coated electric wire and to a rotating electric machine having a coil that is peeled by this peeling device. This peeling device includes: a cutting blade; a rotating mechanism that rotates the cutting blade in a circumferential direction of the coated electric wire to be cut; a cutting mechanism that cuts into the coating of the coated electric wire with the cutting blade; and a peeling mechanism that peels the coating of the coated electric wire by the cutting blade. The cutting mechanism is provided with a link mechanism that converts a driving force of a motor into a vertical reciprocal motion of the cutting blade with respect to the coated electric wire. The cutting blades are circumferentially arranged at substantially equally spaced intervals on a concentric circle with the coated electric wire.

However, it is considered that the peeling device that adopts the techniques disclosed in JP 05-111731 A and JP 2011-250597 A has following problems.

In JP 05-111731 A, the material is unwound from the bobbin and peeled at a specified position. In addition, the material is continuously conveyed to be worked. Consequently, there is possible accumulation of a conveyance error. In order to prevent damage on the wire, it is considered to clamp an outer surface of the wire for conveyance. However, in this case, because the wire is clamped to prevent the damage on the outer surface and then conveyed, it becomes difficult to accurately convey the wire for a specified distance without producing the error. This leads to a difficulty in increasing the accuracy in a longitudinal position of the wire due to the error in a peeling position of the wire, for example. Meanwhile, in the technique disclosed in JP 2011-250597 A, the blade is rotated while cutting a tip of the wire. Therefore, it is considered that the wire has to be positioned each time it is cut. However, because an operation to convey the wire to a working position is complicated, lead time may be extended. Eventually, this may have an adverse affect on a product price.

SUMMARY OF THE INVENTION

The present invention therefore provides a film peeling method and a film peeling device for a film-coated flat wire that allow improvements in working accuracy and production efficiency.

A first aspect of the present invention relates to the film peeling method of the film-coated flat wire that is performed by the film peeling device including: a rotational holder that can rotationally convey in a perpendicular direction to a rotational axis; a positioning mechanism that positions the film-coated flat wire in a longitudinal direction; and a working section that is provided in plural and aligned at specified intervals to work an end portion of the film-coated flat wire in a same direction. The film peeling method includes: holding the film-coated flat wire that is cut in a specified length in advance by the rotational holder; rotationally conveying the film-coated flat wire that is held by the rotational holder in the perpendicular direction to the rotational axis; positioning the conveyed film-coated flat wire by the positioning mechanism; and working the end portion by the working section.

In order to peel the end portion of the film-coated flat wire by the working section, the film-coated flat wire is held and rotationally conveyed by the rotational holder, and is worked in a same direction at plural working positions by the working sections. As a result, it is possible to improve the working accuracy of the film-coated flat wire. For example, as disclosed in JP 05-111731 A, when a method for conveying the film-coated flat wire for sequential working is adopted, there is possible accumulation of errors in a conveyance direction. When a coil segment is formed of the film-coated flat wire, the misalignment of tips of the film-coated flat wires adversely affects welding and may cause a defective weld. However, according to the first aspect of the present invention, the film-coated flat wire is positioned in the longitudinal direction thereof by the positioning mechanism before being worked. This allows the film-coated flat wire to be worked with the end portion thereof being a reference point, and thus it is possible to increase the overall working accuracy. In addition, because of the increase in the working accuracy of the end portion of the film-coated flat wire, the inhibition of the defective weld can also be expected.

In the above aspect, the positioning and the working may each be performed for at least three times. A surface that includes one side of an outer periphery of a cut surface that is formed when the film-coated flat wire is cut perpendicularly to the longitudinal direction may be a first surface. First positioning may include positioning by which the first surface is inclined for 45 degrees to a conveyance surface on which the film-coated flat wire is conveyed by the rotational holder. First working may include working the end portion of the film-coated flat wire in the working section. Second positioning may include positioning by which the first surface is inclined for 45 degrees to the conveyance surface by the rotational holder. Second working may include working the end portion of the film-coated flat wire in the working section to form a third surface that is perpendicular to a second surface that is formed in the first working. Third positioning may include positioning by which a lateral surface of the film-coated flat wire is in parallel with the conveyance surface by the rotational holder. Third working may include working the end portion of the film-coated flat wire in the working section to form a forth surface that is angled at 45 degrees with respect to the second surface and the third surface.

It is possible in the above aspect to chamfer a lateral portion and a corner portion of the end portion of the film-coated flat wire. As described above, a working direction of the working sections is aligned in one direction in this aspect. Accordingly, it is possible to work the end portion of the film-coated flat wire at different angles by rotationally conveying the film-coated flat wire that is held by the rotational holder. The corner portion that is inclined for 45 degrees is worked in the first positioning and working, and the lateral portion is worked in the second positioning and working. Therefore, it is possible to treat a burr that is produced during the working. For example, when eight surfaces of an outer periphery of the film-coated flat wire is worked, the film is peeled from the outer periphery in a rectangular cross section including two long sides, two shorts sides, and four corners, each of which is a connection point between the long side and the short side. In this case, by following the above aspect, the corners are first cut to form the second surface and the third surface in the first working and the second working, and then the short sides are cut to form a fourth surface in the third working. In this procedure, even when the burr is produced in the first working and the second working, it is possible to remove the burr.

The end portion of the film-coated flat wire from which the film has been peeled needs to be welded after being aligned for the formation of a coil. If the burr or the like exists in this state, it may become a cause of the defective weld. In addition, dropping of the burr can be a cause of a short circuit. Therefore, the working may be arranged to remove such a burr.

The above aspect may further include: holding the film-coated flat wire by the rotational holder such that the first surface faces the conveyance surface after the third working; and crushing the end portion of the film-coated flat wire in one direction to crush the burr that is produced on the film-coated flat wire by the working in the working section.

It is possible in the above aspect to further inhibit production of the burr. Although the production of the burr can be inhibited without including crushing of the burr, the burr that is produced in the third working can be left in some cases. Accordingly, because the end portion of the film-coated flat wire is crushed in the one direction in a state where the film-coated flat wire is held by the rotational holder such that the first surface faces the conveyance surface, a direction in which the burr is produced is aligned in the above aspect. Therefore, it is possible to treat the burr that is produced in the third working.

In the above aspect, the rotational holder may be prepared in plural and connected annularly to one another by a link mechanism.

Because the rotational holder is prepared in plural and connected annularly to one another by the link mechanism in the above aspect, it is possible to continuously work the film-coated flat wire in sequence that is held by the rotational holder.

A second aspect of the present invention relates to a film peeling device. The film peeling device includes: a rotational holder that holds the film-coated flat wire, includes a rotational axis that is parallel to a longitudinal direction of the film-coated flat wire, and can rotationally convey in a perpendicular direction to the rotational axis; a working section that is prepared in plural at specified intervals and works an end portion of the film-coated flat wire in a same direction; and a positioning mechanism that positions the film-coated flat wire in the longitudinal direction when the film-coated flat wire is conveyed by the rotational holder to a position where the working section works.

It is possible with the above aspect to provide the film peeling device that can achieve the high working accuracy in peeling of the end portion of the film-coated flat wire. The related art disclosed such as in JP 05-111731 A adopts a method including the steps of peeling the film-coated flat wire after conveying the film-coated flat wire for a specified distance and cutting the film-coated flat wire in a specified length. In this method, because the film-coated flat wire was repeatedly clamped and unclamped for conveyance, there was possible accumulation of conveying errors. On the other hand, in the above aspect, the film-coated flat wire is positioned in the longitudinal direction thereof after being conveyed by the rotational holder, and is worked at the end portion in the same direction in the working section. Therefore, it is possible to peel the film-coated flat wire for a specified distance from the end portion thereof, and thus is possible to increase the working accuracy.

The above aspect may further include: a link mechanism that connects the plural rotational holders arranged annularly; and a drive mechanism that drives the rotational holders connected by the link mechanism to rotationally move the rotational holders.

In the above aspect, because the plural rotational holders are arranged annularly and connected to one another by the link mechanism, it is possible to rotate the rotational holders to make an endless trajectory. Therefore, it is possible to move the rotational holders by the single drive mechanism, and thus is possible to reduce the cost of the film peeling device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 13A to E are schematic views for showing a procedure for assembling a coil segment to a stator core according to the first embodiment of the present invention;

DETAILED DESCRIPTION OF EMBODIMENTS

A description will first be made on a first embodiment of the present invention with reference to the drawings.

Figure 1:
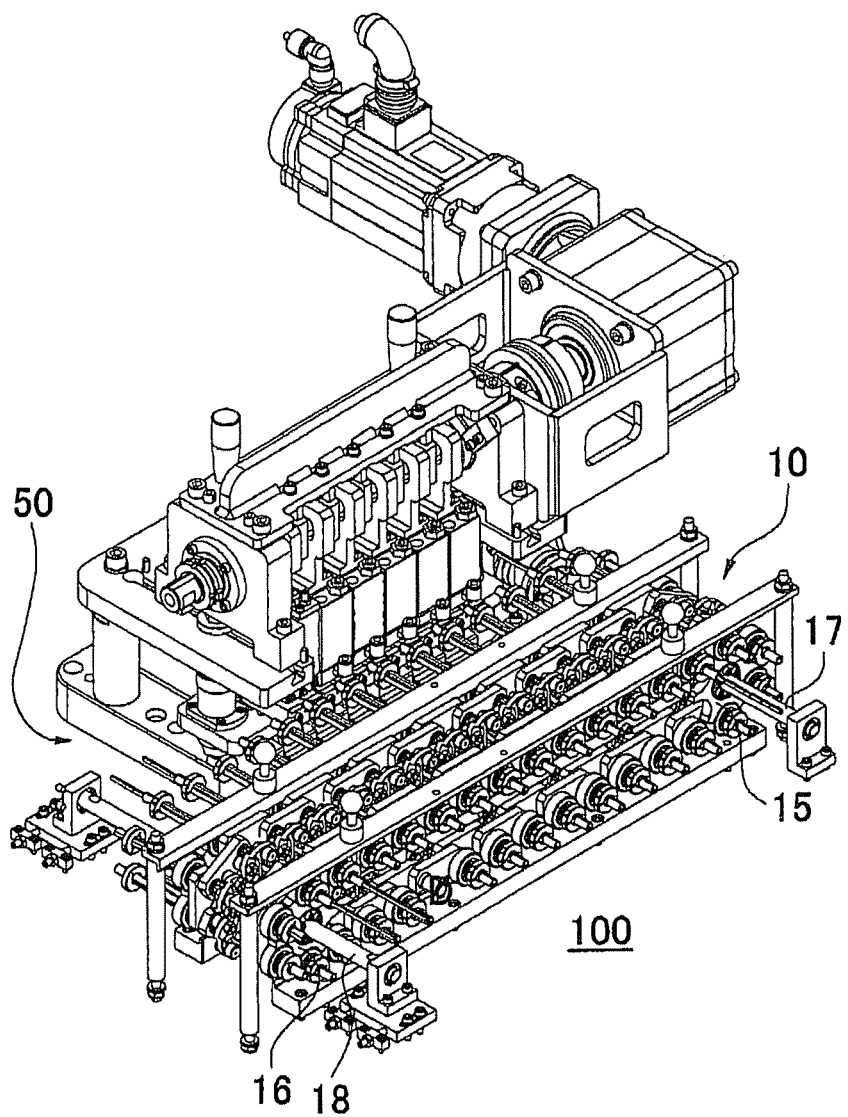
FIG. 1 is a perspective view for showing a configuration of a film peeling device according to a first embodiment of the present invention.
Figure 2:
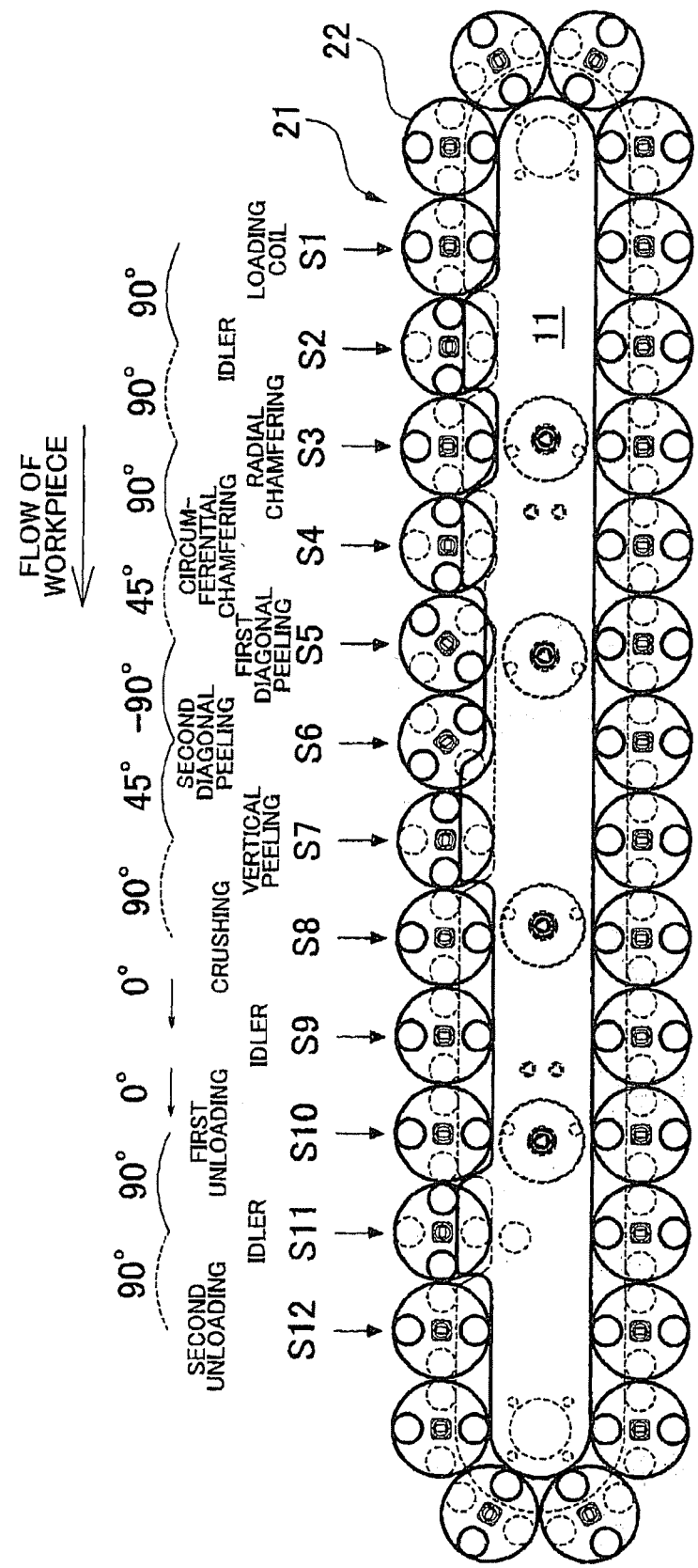
FIG. 2 is a plan view of a first cam plate in a conveying mechanism according to the first embodiment of the present invention.
Figure 3:
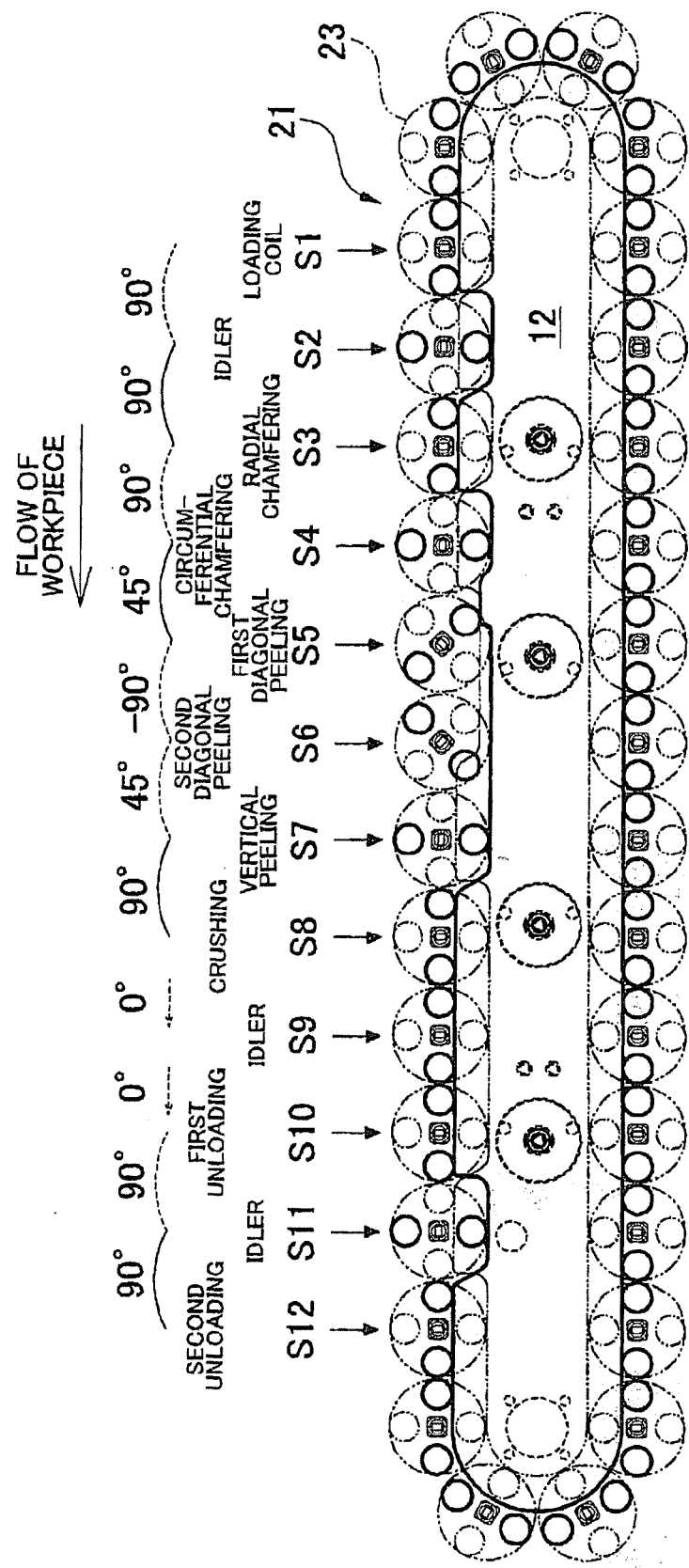
FIG. 3 is a plan view of a second cam plate in the conveying mechanism according to the first embodiment of the present invention.
Figure 4:
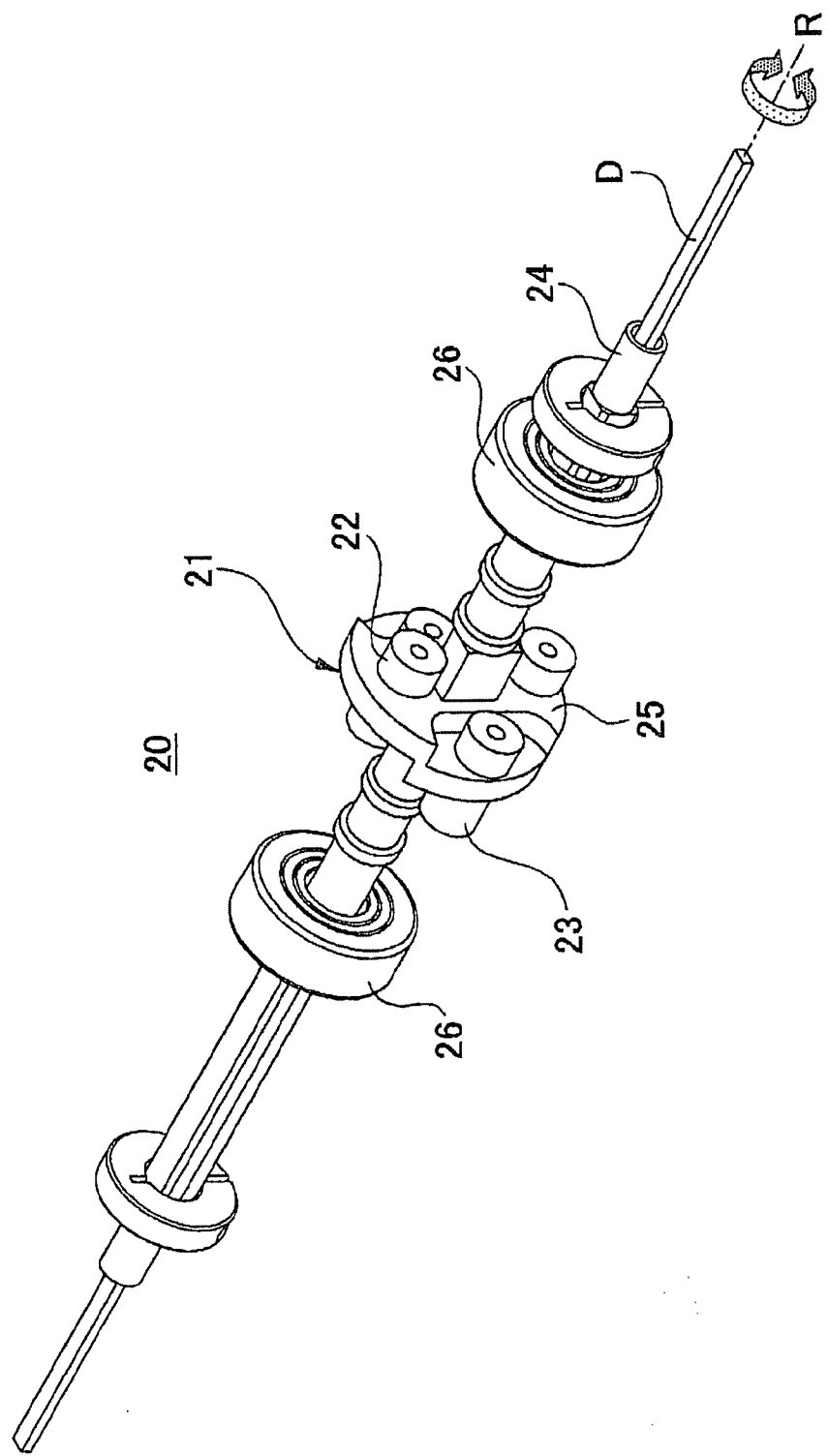
FIG. 4 is a perspective view of a coil conveying jig according to the first embodiment of the present invention.
Figure 5:
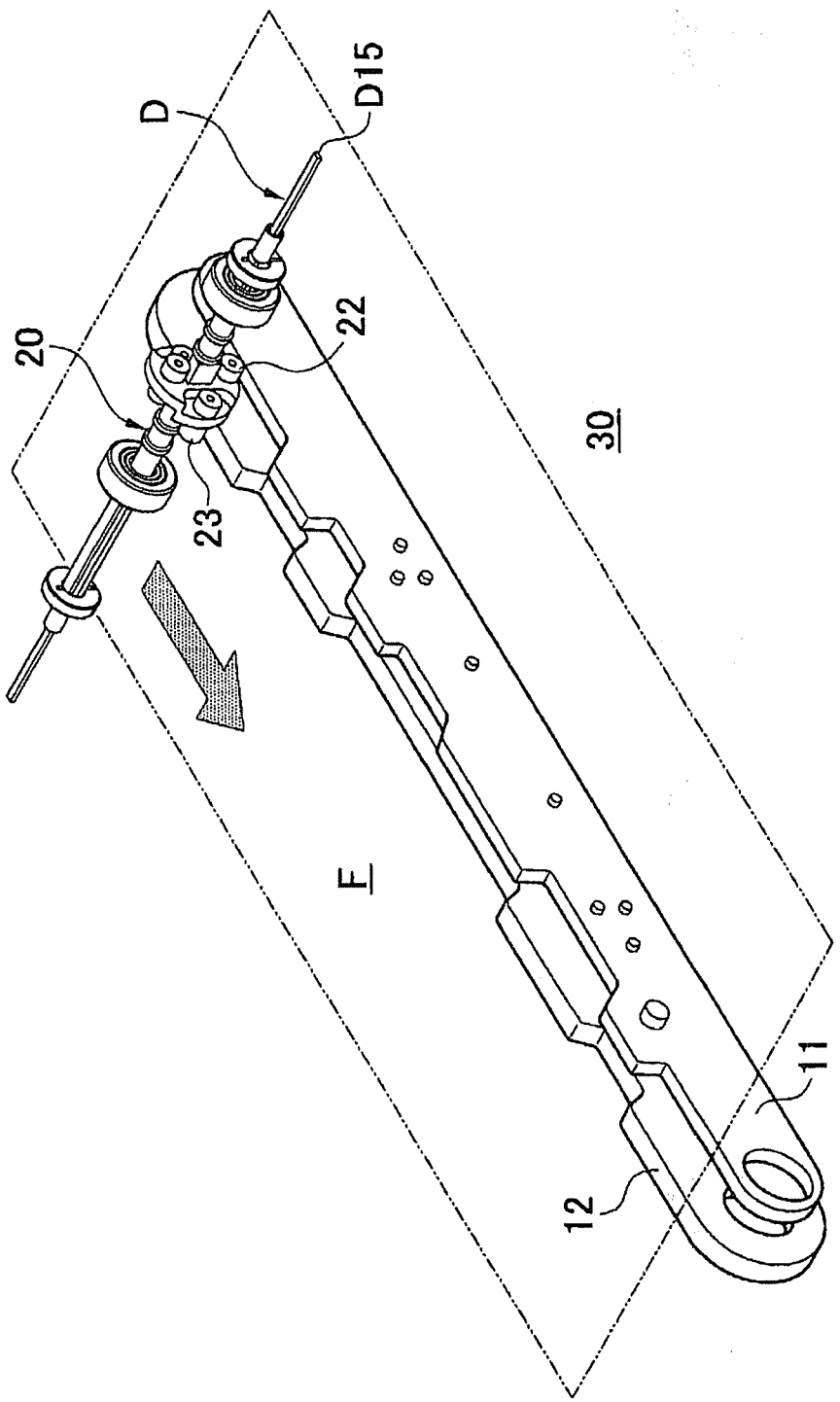
FIG. 5 is a perspective view of a coil guide section according to the first embodiment of the present invention.

FIG. 1 is a view for showing a configuration of a film peeling device according to a first embodiment. A film peeling device 100 includes a conveying mechanism 10 and a working section 50. FIG. 2 is a plan view of a first cam plate 11 in the conveying mechanism 10. FIG. 3 is a plan view of a second cam plate 12 in the conveying mechanism 10. The first cam plate 11 and the second cam plate 12 are arranged in parallel in the conveying mechanism 10. FIG. 4 is a perspective view of a coil conveying jig 20. FIG. 5 is a perspective view of a coil guide section 30. The coil conveying jig 20 is guided by the first cam plate 11 and the second cam plate 12 to rotationally move. A cam mechanism 21 of the coil conveying jig 20 includes a first cam follower 22 and a second cam follower 23.

The first cam follower 22 and the second cam follower 23 are rotatably held by a disk 25. The first cam plate 11 and the second cam plate 12 are arranged in parallel, and then the coil conveying jig 20 is perpendicularly arranged thereon with respect to the first cam plate 11 and the second cam plate 12. The first cam follower 22 abuts against the first cam plate 11 while the second cam follower 23 abuts against the second cam plate 12. Accordingly, the coil conveying jig 20 is guided by the first cam plate 11 and the second cam plate 12 to rotationally move on a conveying surface F.

As shown in FIG. 4, the coil conveying jig 20 has a flat-wire holding section 24 for holding a flat wire D. The flat-wire holding section 24 is a tubular member that is formed with a rectangular hole penetrated therethrough and thus can hold the flat wire D, and is rotated in conjunction with rotation of the cam mechanism 21. At this time, a rotational axis R is substantially located at a center of the flat wire D as shown in FIG. 4. The flat wire D is formed from a type of metal that has high conductivity and a rectangular cross section, and an insulating film is formed therearound. An inner peripheral portion of the flat-wire holding section 24 is formed so smoothly that it is possible to convey the flat wire D without damaging the flat wire D. In addition, the coil conveying jig 20 includes a guide bearing 26 in two different locations. The flat-wire holding section 24 is rotatably supported by the guide bearing 26.

Figure 6:
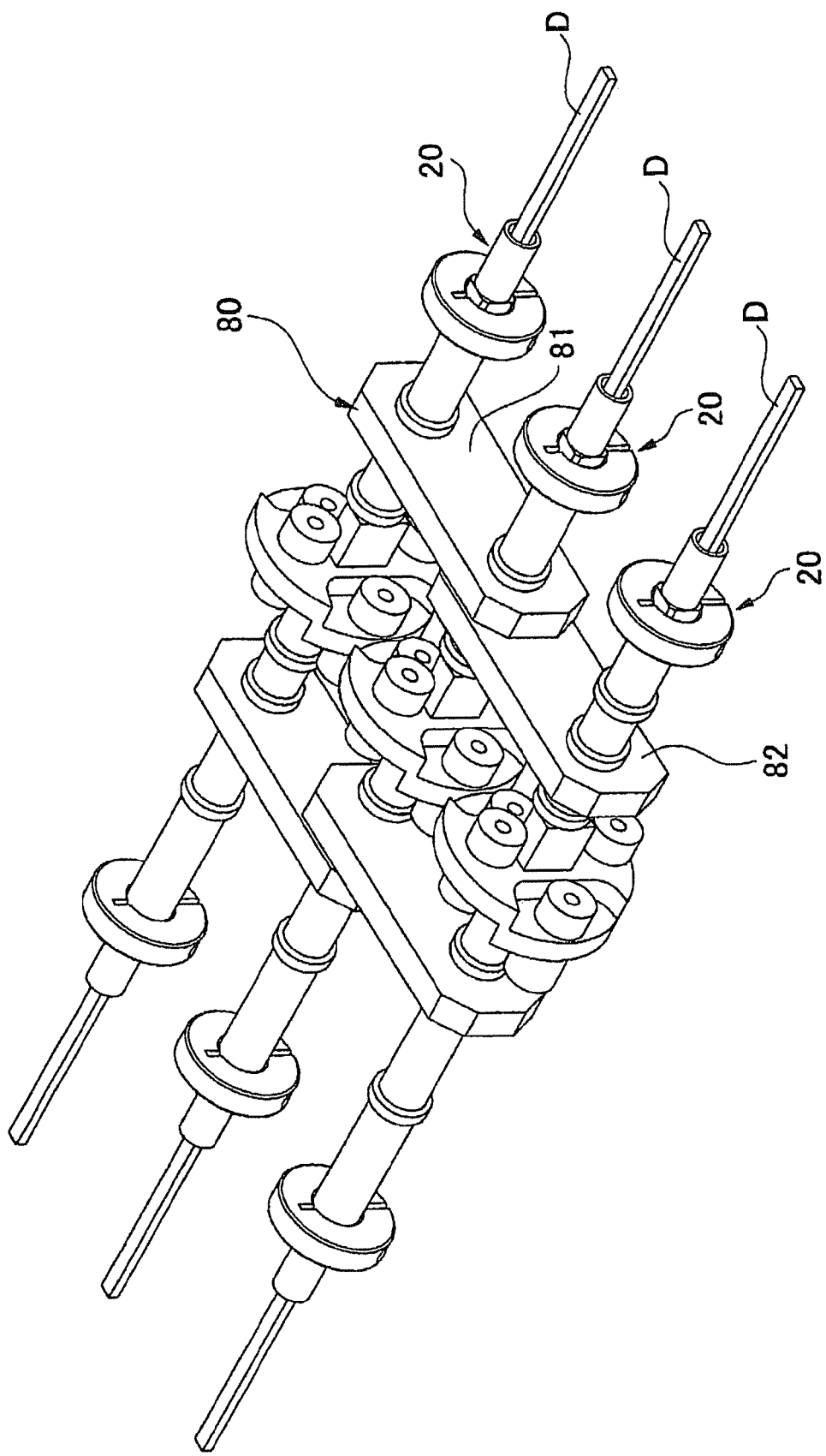
FIG. 6 is a perspective view for showing a state where the coil conveying jigs are linked according to the first embodiment of the present invention.

FIG. 6 is a perspective view for showing a state where the coil conveying jigs 20 are linked. A link plate 80 is a plate for connecting the coil conveying jigs 20 that are arranged adjacently to one another, and has a function to rotatably connect the coil conveying jigs 20 in parallel. In FIG. 6, the three coil conveying jigs 20 are connected by the two link plates 80 that serve as an outer link plate 81 and an inner link plate 82. However, in practice, the coil conveying jigs 20 are arranged annularly and moved to make an endless trajectory. Each of the coil conveying jigs 20 are connected by the link plate 80.

As shown in FIG. 1, a drive gear 15 and an idler gear 16 that are provided at both ends of the conveying mechanism 10 are respectively fixed to a drive shaft 17 to which a driving force is transmitted and an idler shaft 18 that is supported in a freely rotating manner. Each of the drive gear 15 and the idler gear 16 has a teeth section to move the guide bearing 26 that supports the coil conveying jig 20. Accordingly, it is possible to rotatably move the coil conveying jigs 20, which are connected by the link plates 80, in an annular direction by rotating the drive shaft 17 with unillustrated power.

Figure 7:
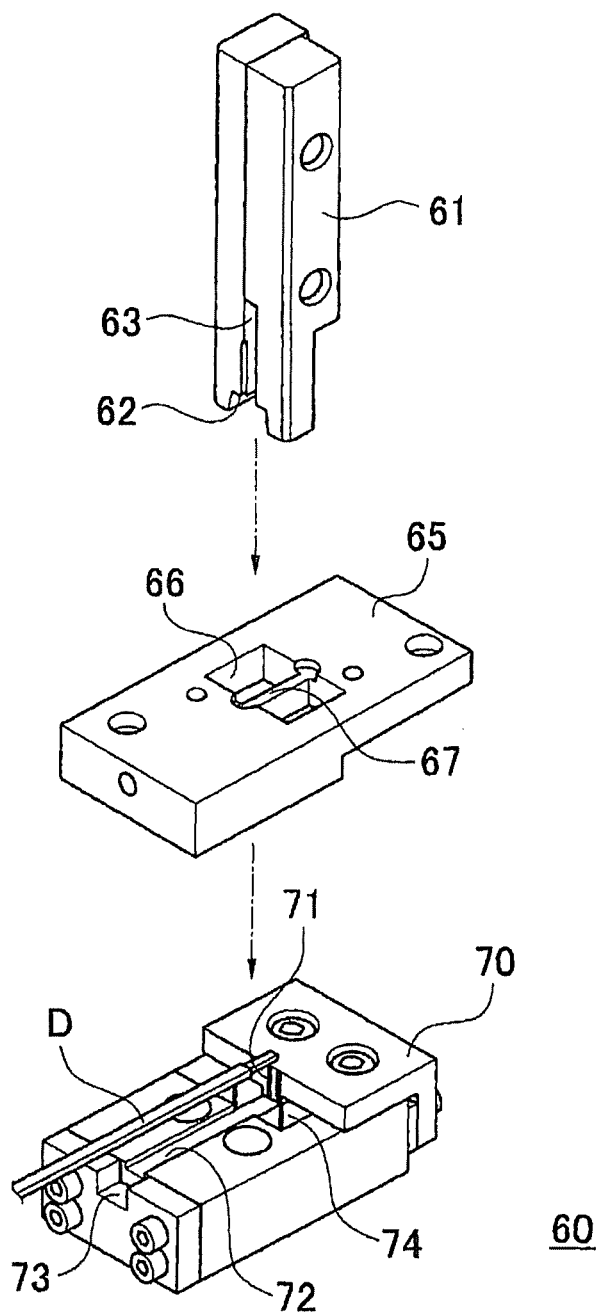
FIG. 7 is an exploded perspective view of a peeling mechanism according to the first embodiment of the present invention.

Meanwhile, the working section 50 has plural peeling mechanisms 60. FIG. 7 is an exploded perspective view of a peeling mechanism. The peeling mechanism 60 is configured to include a punch 61, a pressing plate 65, and a die 70, and peels a tip portion of the flat wire D. The punch 61 includes a blade edge 62 and is also provided with a slit 63. The blade edge 62 is arranged on both sides of the slit 63 and peels the insulating film that is formed on a surface of the flat wire D. The pressing plate 65 has a function to make a pair with the die 70 and hold the flat wire D, and is provided with a guide hole 66 and a flat-wire pressing section 67. The flat-wire pressing section 67 is disposed between the two guide holes 66 and is also disposed to correspond with the slit 63 of the punch 61.

The die 70 includes a positioning section 71, a flat-wire supporting section 72, a concave section 73, and a through hole 74. The positioning section 71 is used to position the flat wire D in a longitudinal direction. The positioning section 71 has a function to position the flat wire D by abutting a tip of the flat wire D against the positioning section 71. The flat-wire supporting section 72 has a function to restrict movement of the flat wire D in a width direction. The concave section 73 is provided to prevent interference thereof with a tip of the flat-wire holding section 24. The through hole 74 is provided to avoid the blade edge 62. The flat wire D is held by the flat-wire supporting section 72 of the die 70 and the flat-wire pressing section 67 of the pressing plate 65. Then, a specified portion of the flat wire D can be peeled by the blade edge 62.

Figure 8:
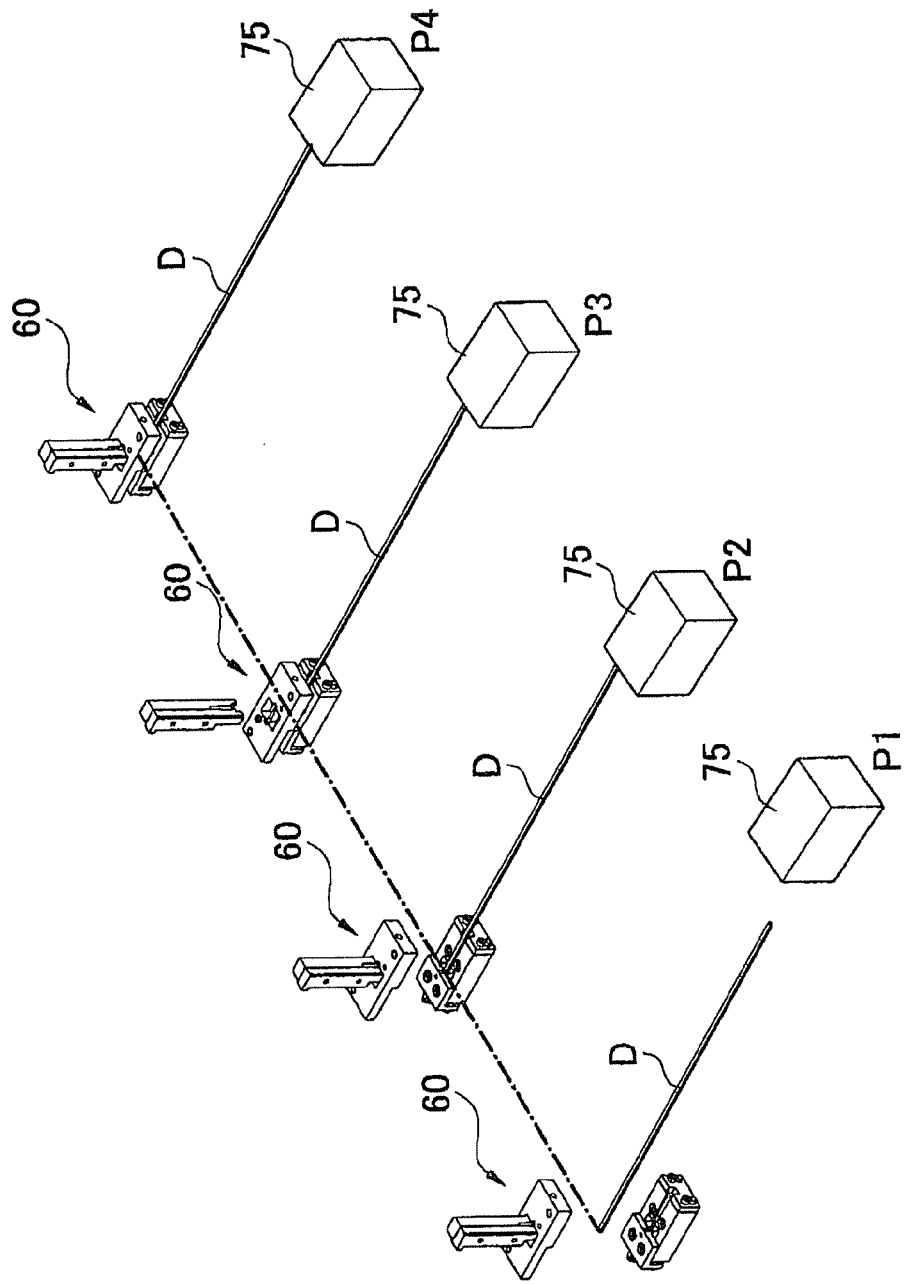
FIG. 8 is a perspective view for showing a procedure for peeling a flat wire according to the first embodiment of the present invention.
Figure 9:
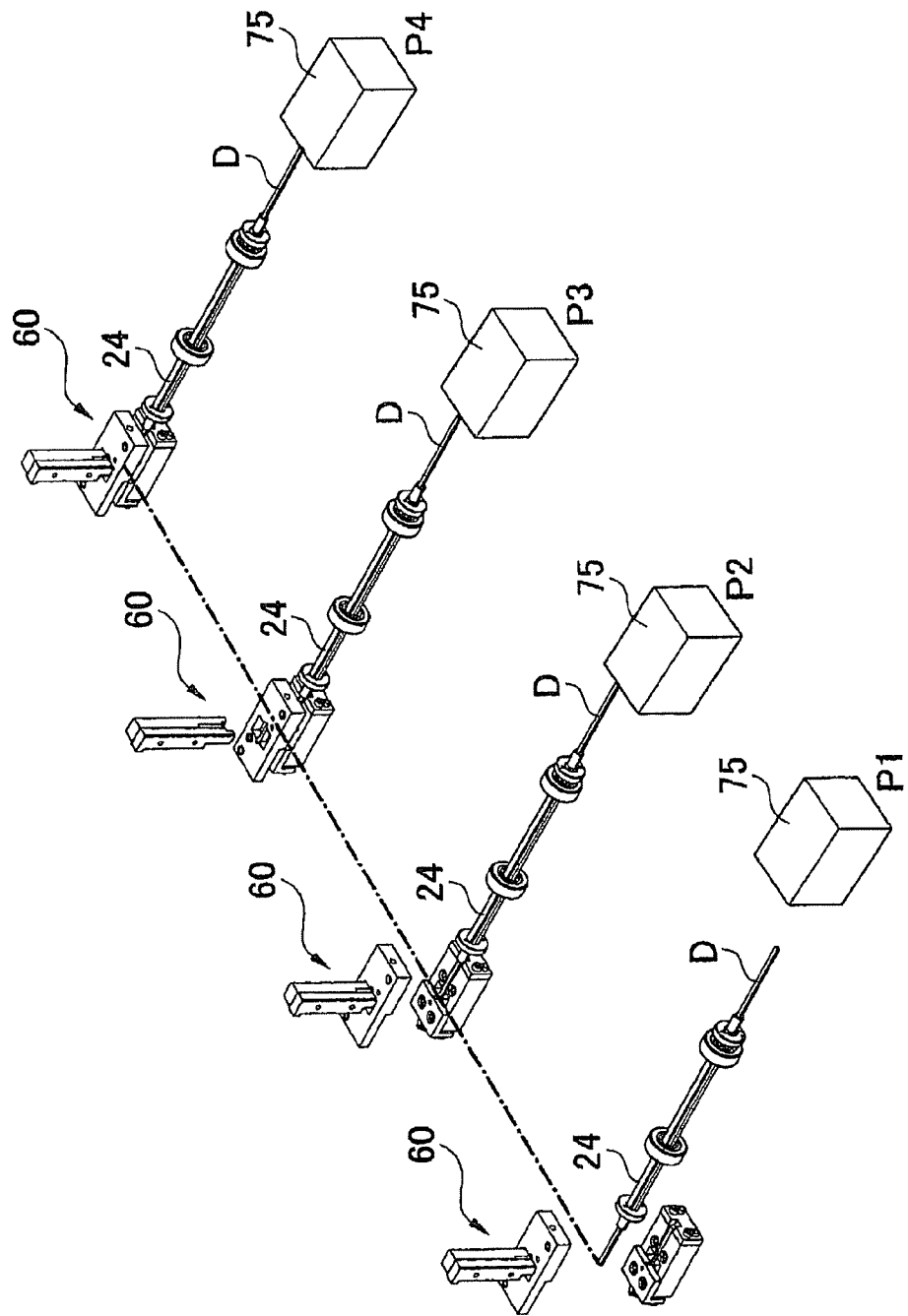
FIG. 9 is a perspective view of the flat wire that is conveyed by a flat-wire holding section according to the first embodiment of the present invention.

Next, a procedure for working the flat wire D will be described. FIG. 8 is a perspective view for showing a procedure for peeling the flat wire D. It should be noted that orders and arrangements of components in FIG. 8 do not correspond to those in FIG. 1, FIG. 2, and FIG. 3 due to a purpose of description. FIG. 9 is a perspective view of the flat wire D that is conveyed by the flat-wire holding section 24. FIG. 9 corresponds to FIG. 8. The operation of the peeling mechanism 60 is shown in FIG. 8. In a position P1, the flat wire D that is placed in a specified position by the coil conveying jig 20 is shown. In a position P2, the end portion of the flat wire D is pressed by a positioning pusher 75 and is abutted against the positioning section 71 of the peeling mechanism 60. This leads to the abutment of an end surface of the flat wire D against an end surface of the positioning section 71, and thus the flat wire D is positioned with the positioning section 71 being a reference. As shown in FIG. 7 and FIG. 9, the concave section 73 of the peeling mechanism 60 prevents interference between the die 70 and the flat-wire holding section 24.

Figure 10:
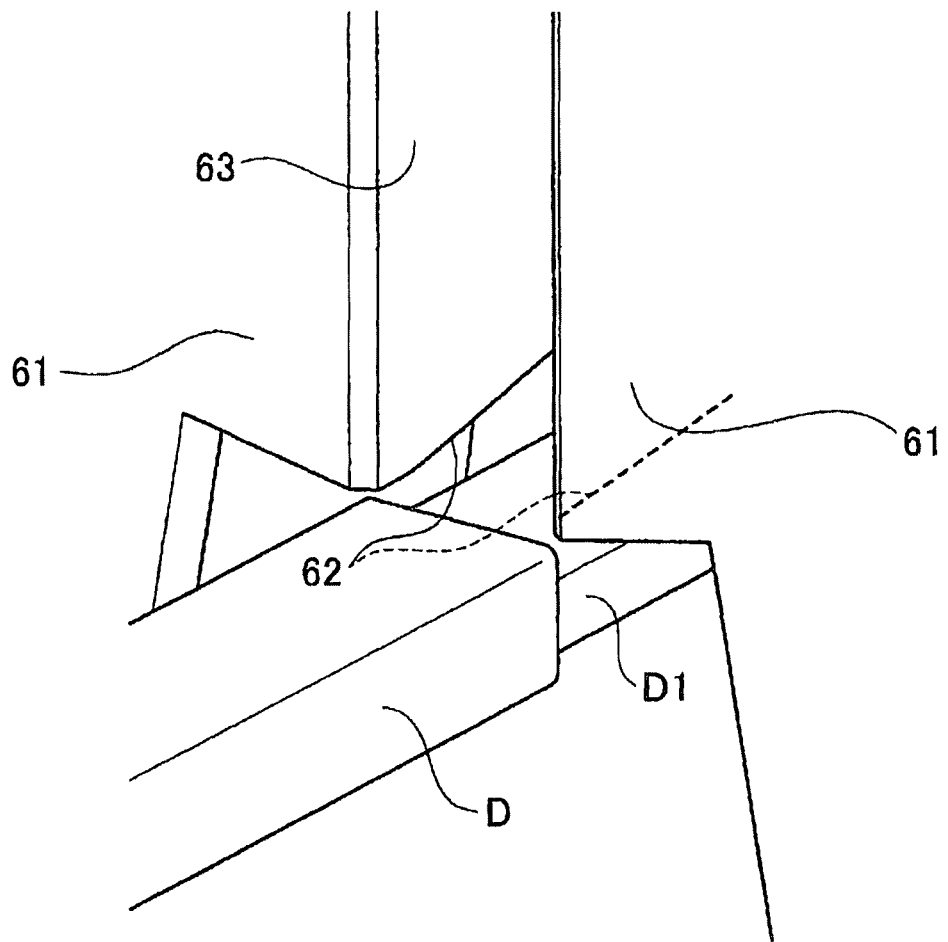
FIG. 10 is an enlarged perspective view of a film peeled portion of the flat wire according to the first embodiment of the present invention.

In a position P3, the flat wire D is fixedly held between the pressing plate 65 and the die 70 of the peeling mechanism 60 in a vertical direction. In a position P4, the punch 61 is lowered to peel the insulating film on the end portion of the flat wire D. FIG. 10 is an enlarged perspective view of a film peeled portion of the flat wire D. A tip of the flat wire D is formed with a peeled portion D1 by the blade edge 62 of the punch 61.

Figure 11:
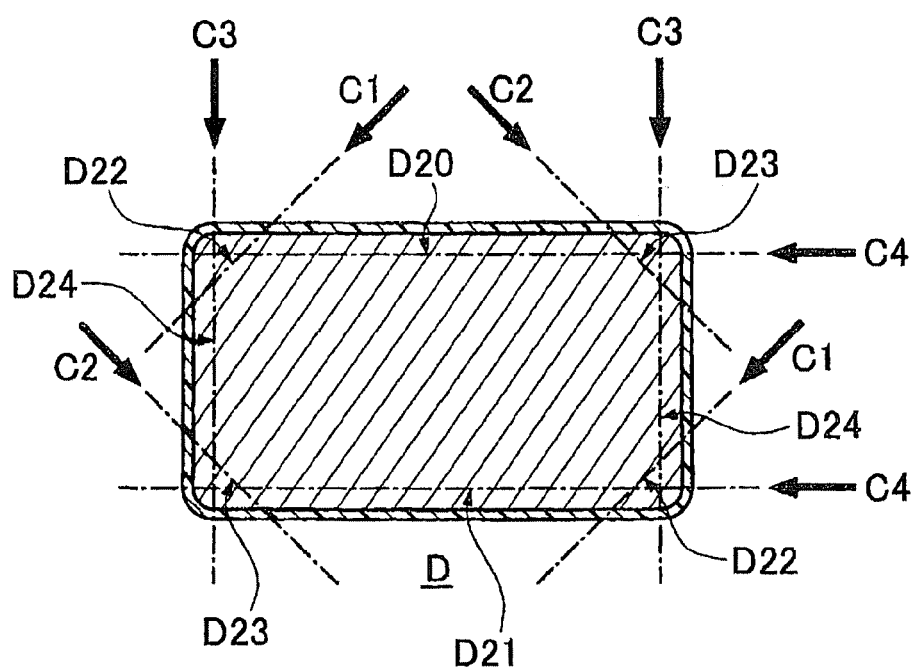
FIG. 11 is a cross sectional view for showing a procedure for peeling a tip of the flat wire according to the first embodiment of the present invention.
Figure 12:
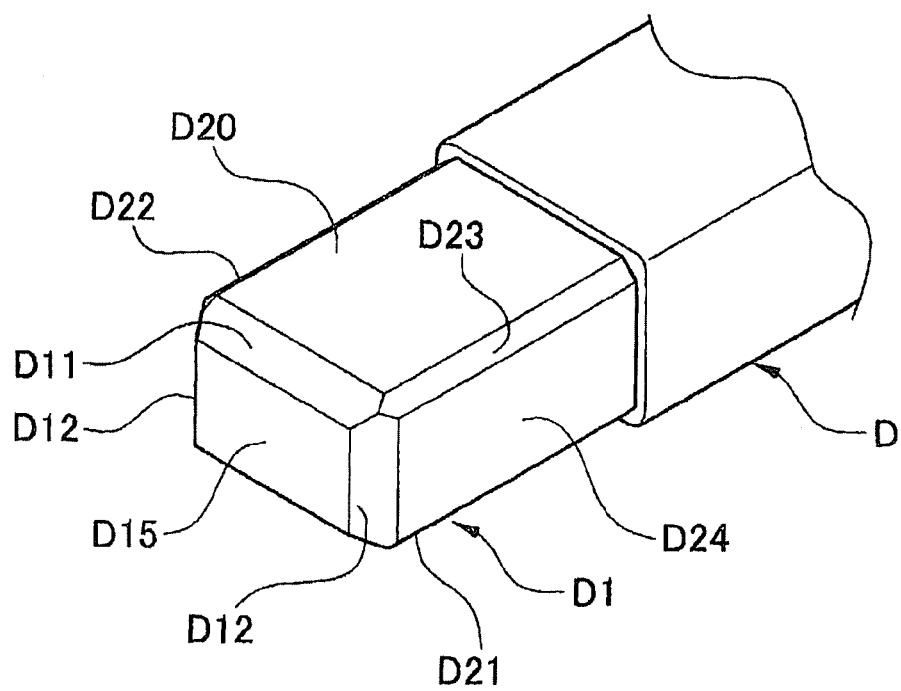
FIG. 12 is a perspective view of the tip of the flat wire according to the first embodiment of the present invention.

Next, a description will be made on a procedure for conveying the flat wire D. FIG. 11 is a cross sectional view of the flat wire D. FIG. 12 is a perspective view of the tip of the flat wire D. The flat wire D is conveyed by using the coil conveying jig 20. As shown in FIG. 2 and FIG. 3, an orientation of the flat wire D is determined by the shapes of the first cam plate 11 and the second cam plate 12. In a loading position S1 shown in FIG. 2 and FIG. 3, the flat wire D that has been cut in a specified length is inserted in the flat-wire holding section 24 from the outside. Then, the first cam plate 11 and the first cam follower 22 are actuated to rotate the coil conveying jig 20 for 90 degrees from the loading position S1 and convey the flat wire D to an idler S2.

The idler S2 is provided for position adjustment. The second cam plate 12 and the second cam follower 23 are actuated to rotate the coil conveying jig 20 for 90 degrees from the idler S2 and convey the flat wire D to a radially chamfering section S3. In the radially chamfering section S3, a first tip slope D11 in the peeled portion D1 of the flat wire D is chamfered. Because the first tip slope D11 is formed only on one side, a punch with a single edged blade is used here instead of the punch 61 that is shaped as shown in FIG. 10. Then, the first cam plate 11 and the first cam follower 22 are actuated to rotate the coil conveying jig 20 for 90 degrees from the radially chamfering section S3 and convey the flat wire D to a circumferentially chamfering section S4.

In the circumferentially chamfering section S4, a second tip slope D12 in the peeled portion D1 of the flat wire D is chamfered. Because the second tip slope D12 is formed on both sides, the second tip slope D12 is worked by a punch with a double-edged blade such as the punch 61 shown in FIG. 10. Then, the second cam plate 12 and the second cam follower 23 are actuated to rotate the coil conveying jig 20 for 45 degrees from the circumferentially chamfering section S4 and convey the flat wire D to a first diagonally peeling position S5. In this state, the flat wire D is held such that a first surface D21 shown in FIG. 11 is inclined at 45 degrees to the conveying surface F (see FIG. 5).

In the first diagonally peeling position S5, the flat wire D is cut at a first cutting line C1 that is shown in FIG. 11 to work a ridge of the peeled portion D1. This leads to the formation of a second surface D22 by the punch 61. Then, the first cam plate 11 and the first cam follower 22 are actuated to reversely rotate the coil conveying jig 20 for 90 degrees from the first diagonally peeling position S5 and convey the flat wire D to a second diagonally peeling position S6. In this state, the flat wire D is held such that the first surface D21 shown in FIG. 11 is reversely inclined at 45 degrees to the conveying surface F with respect to the state in S5.

In the second diagonally peeling position S6, the flat wire D is cut at a second cutting line C2 that is shown in FIG. 11 to work the ridge of the peeled portion D1. This leads to the formation of a third surface D23 by the punch 61. Four corners of the peeled portion D1 are chamfered in the first diagonally peeling position S5 and the second diagonally peeling position S6. Then, the first cam plate 11 and the first cam follower 22 are actuated to rotate the coil conveying jig 20 for 45 degrees from the second diagonally peeling position S6 to convey the flat wire D to a vertical peeling position S7. In the vertical peeling position S7, the flat wire D is cut at a short-side peeling line C3 to form a fourth surface D24. Then, the second cam plate 12 and the second cam follower 23 are actuated to rotate the coil conveying jig 20 for 90 degrees from the vertical peeling position S7 to convey the flat wire D to a horizontal peeling position S8.

In the horizontal peeling position S8, the flat wire D is cut at a long-side peeling line C4 to form the first surface D21 and an upper surface D20. The flat wire D is conveyed from the horizontal peeling position S8 to a crushing position S9 without rotating the coil conveying jig 20. In the crushing position S9, the flat wire D is crushed in the width direction. This is performed not for a purpose of changing the width of the flat wire D but for a purpose of crushing a burr that is produced when the flat wire D is worked. The flat wire D is conveyed from the crushing position S9 to a first unloading section S10 without rotating the coil conveying jig 20.

In the first unloading section S10, the flat wire D in which the peeled portion D1 has been worked is unloaded from the film peeling device 100. Then, the first cam plate 11 and the first cam follower 22 are actuated to rotate the coil conveying jig 20 for 90 degrees from the first unloading section S10 and convey the flat wire D to an idler S11. The idler S11 is provided for the position adjustment. Then, the second cam plate 12 and the second cam follower 23 are actuated to rotate the coil conveying jig 20 from the idler S11 and convey the flat wire D to a second unloading section S12.

In the second unloading section S12, the flat wire D in which the peeled portion D1 has been worked is unloaded from the film peeling device 100. A reason for providing two unloading sections of the first unloading section S10 and the second unloading section S12 is to allow sorting of the flat wire D by type. In other words, the two unloading sections are provided because, depending on a circumstance, plural types of the flat wire D have to be worked. The flat wire D has to be formed with the peeled portion D1 on both sides. Thus, the flat wire D may be worked twice by the film peeling device 100 to form the peeled portion D1 on both sides. Alternatively, two of the film peeling devices 100 may be provided to form the peeled portion D1 on both sides of the flat wire D.

Figure 14:
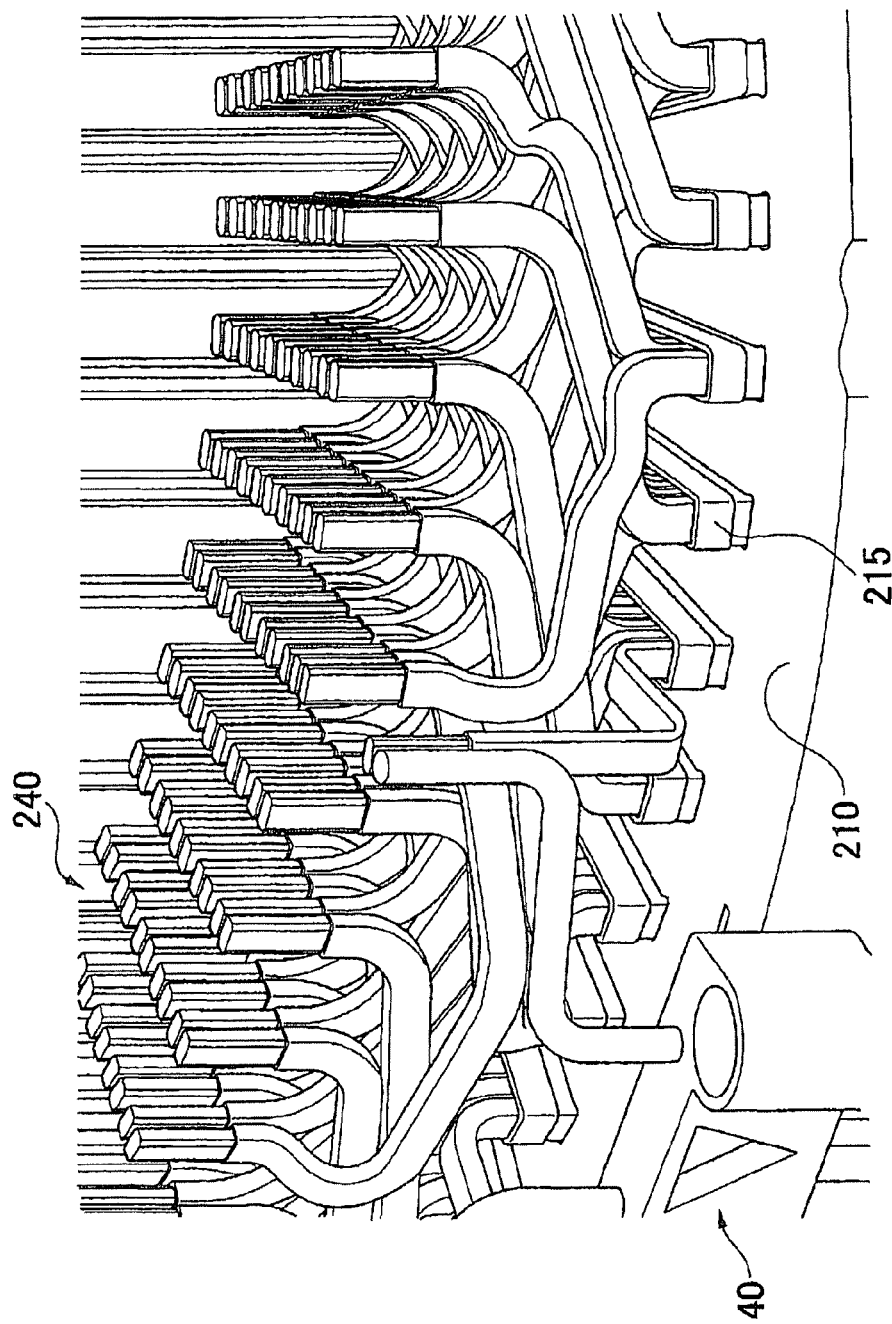
FIG. 14 is a perspective view of a coil end of a stator according to the first embodiment of the present invention.

After the peeled portion D1 is formed on both sides of the flat wire D as described above, the flat wire D is bent in a substantial U shape. After a coil is formed from this bent flat wire D, a rotating electric machine is formed by using a coil segment. FIGS. 13A to E are schematic views for showing a procedure for assembling the coil segment to a stator core. FIG. 14 is a perspective view of a coil end of a stator. In FIGS. 13A to E, the details are not shown for a purpose of a schematic illustration. As shown in FIG. 13A, a stator core 210 includes teeth 211 and slots 212 on an inner periphery thereof. As shown in FIG. 13B, an insulator 215 is inserted in the slot 212 of the stator core 210. As shown in FIG. 13D, a segment 205 that is formed from the flat wire D shaped in the substantial U shape by edgewise bending, which is shown in FIG. 13C, is inserted in the slots 212 of the stator core 210.

Then, a first end portion 205a and a second end portion 205b of the segment 205 that are projected from an end surface of the stator core 210 as shown in FIG. 13D are bent as shown in FIG. 13E to form a joined portion 205c. Accordingly, a coil 230 is formed. A stator 250 is adapted to function as the stator 250 of the rotating electric machine by including the coil 230 in the stator core 210.

The first embodiment produces the following advantages and effects with the configuration described above.

First, improvements in working accuracy and production efficiency can be raised as an effect. The first embodiment relates to a method for peeling the film of the flat wire D in which the film on the end portion of the flat wire D is peeled by the peeling mechanism 60. The flat wire D that is cut in advance in the specified length is held by the coil conveying jig 20 that can rotationally convey the flat wire D in a perpendicular direction to the rotational axis R of the flat wire D. The coil conveying jig 20 holds and rotationally conveys the flat wire D in the perpendicular direction to the rotational axis R. The thus conveyed flat wire D is abutted against the positioning section 71 by the positioning pusher 75 to be positioned. Then, the end portion of the flat wire D is worked by the peeling mechanisms 60 that are provided in plural and aligned in a same direction at specified intervals to work the end portion of the flat wire D.

Because the film peeling device 100 is configured as described above, the flat wire D is perpendicularly conveyed with respect to the longitudinal direction as shown in FIG. 1, and then the peeled portion D1 is worked. Also, because the film peeling device 100 includes the positioning section 71 in the peeling mechanism 60 and the positioning pusher 75, it can perform peeling with the positioning section 71 as the reference. For example, in a case where a film-coated flat wire is unwound from the bobbin and successively conveyed to be peeled as disclosed in JP 05-111731 A, a conveyance error may be accumulated in a conveying direction to cause a difficulty in increasing the working accuracy. On the contrary, the film peeling device 100 of the first embodiment can contribute to the increase in the working accuracy.

More specifically, in the technique disclosed in JP 05-111731 A, the film-coated flat wire is clamped and conveyed. Then, the film-coated flat wire is peeled before being cut in the specified length. In such a technique, because the surface of the film-coated flat wire cannot be damaged, the film-coated flat wire is conveyed with assistance of a frictional force between a clamp and a surface of the film-coated flat wire. As a result, there occurs a possibility of the error even with the accurate conveyance. In addition, because positioning cannot be performed due to the continuous conveyance, the error may be accumulated.

On the contrary, in the first embodiment of the present invention, a technique is adopted in which the flat wire D is held by the flat-wire pressing section 67 and the flat-wire supporting section 72 in the peeling mechanism 60 in a state where the positioning section 71 is pressed against the end surface of the flat wire D that has been cut in the specified length. Then, the flat wire D is worked by the punch 61. Therefore, a distance from the end surface of the peeled portion D1 is maintained to be constant. In addition, because the flat wire D is positioned each time, there is no possible accumulation of the error. For the above reason, it is possible to increase the working accuracy of the flat wire D by using the film peeling device 100. It can also be expected that the increased working accuracy contribute to inhibition of a defective weld of a coil end portion 240, which is shown in FIG. 14.

In addition, as described above, the first embodiment of the present invention adopts the configuration in which the coil conveying jig 20 that holds the flat wire D is perpendicularly conveyed with respect to the longitudinal direction of the flat wire D. Accordingly, downsizing of a device space for the increased working efficiency can be raised as yet another effect. When the longitudinal direction of the flat wire D is the same as the conveying direction as disclosed in JP 05-111731 A, it is necessary to align working processes in the conveying direction. In addition to the working of the eight surfaces of the flat wire D as shown in FIG. 11, it is also necessary to work an end portion D15 that is shown in FIG. 12 as well as the first tip slope D11 and the second tip slope D12. Therefore, a working device has to be provided in plural positions, and consequently, a substantially large space is necessary to align these working devices in the conveying direction of the flat wire D.

On the contrary, in the film peeling device 100 of the first embodiment of the present invention, the peeling mechanisms 60 are perpendicularly arranged in parallel with respect to the longitudinal direction of the flat wire D. Accordingly, it is possible to keep the film peeling device 100 in a compact size as shown in FIG. 1. In addition, because the adjacent peeling mechanisms 60 are close to one another, the flat wire D has to be conveyed only for a short distance. Therefore, it is also possible to contribute to the improvement in a working cycle time.

Here, a surface that includes one side of an outer periphery of the cut surface (D15) that is formed when the flat wire D is cut perpendicularly with respect to the longitudinal direction by the film peeling device 100 of the first embodiment of the present invention is the first surface (D21). In a first working process, the flat wire D is held in a first working position such that the first surface is inclined at 45 degrees from the conveying surface F on which the flat wire D is conveyed by the coil conveying jig 20. Then, the end portion of the flat wire D is worked by the peeling mechanism 60. The worked surface of the flat wire D is the second surface (D22). In a second working process, the flat wire D is held in a second working position by the coil conveying jig 20 such that the first surface is inclined at 45 degrees from the conveying surface F. Then, the end portion of the flat wire D is worked by the peeling mechanism 60 to form the third surface (D23) that is perpendicular to the second surface formed in the first working position. In a third working process, the flat wire D is held in a third working position by the coil conveying jig 20 such that a lateral surface of the flat wire D is parallel to the conveying surface F. Then, the end portion of the flat wire D is worked by the peeling mechanism 60 to form the fourth surface (D24) that is angled at 45 degrees with respect to the second surface and the third surface.

With reference to the cross sectional view of the flat wire D in FIG. 11, the first surface corresponds to the first surface D21, and the second surface D22 and the third surface D23 are formed to be angled at 45 degrees with respect to the first surface D21. The fourth surface D24 is angled at 45 degrees with respect to the second surface D22 and the third surface D23. In addition, the first surface D21 and the fourth surface D24 are perpendicular to one another. As described above, the flat wire. D is rotationally conveyed and appropriately held by the coil conveying jig 20 when the peeled portion D1 of the flat wire D is worked. Therefore, the peeling mechanism 60 is able to perform peeling in a precise manner. In addition, due to the configuration that the second surface D22 and the third surface D23 are worked before the fourth surface D24 is worked, the burr is formed to be projected toward the first surface D21 side. Accordingly, it is possible to remove the burr by pressing and crushing the peeled portion D1 in one direction in the crushing position S9.

In order to form the coil 230, the peeled portion D1 of the flat wire D from which the film has been peeled has to be welded after being arranged. If the burr exists on the peeled portion D1 in this state, it can be a cause of the defective weld. In addition, the burr is not preferred because dropping thereof can be a cause of a short circuit. Therefore, when such a burr is produced during the formation of the peeled portion D1 of the flat wire D, it is desired to remove the burr for the formation of the coil 230.

Furthermore, because the plural coil conveying jigs 20 are prepared and annularly connected to one another by the link plate 80, the continuous working is possible, which can be raised as a further effect. The coil conveying jig 20 holds the flat wire D while the coil conveying jig 20 is rotatably held by the link plate 80. Then, the coil conveying jig 20 moves along with the rotation of the drive gear 15. At this time, the coil conveying jig 20 is rotated by the first cam plate 11 and the second cam plate 12. Because the coil conveying jigs 20 are joined to one another by the link plate 80, the coil conveying jig 20 is moved under the conveying mechanism 10 for reuse in the loading position S1 after unloading the flat wire D in the second unloading section S12. Accordingly, it is possible to continuously work the flat wire D.

Next, a description will be made on a second embodiment of the present invention with reference to the drawings. It should be noted that a configuration of the second embodiment is substantially the same as that of the first embodiment but is slightly different in the working processes. The following description will be made on differences.

Figure 15:
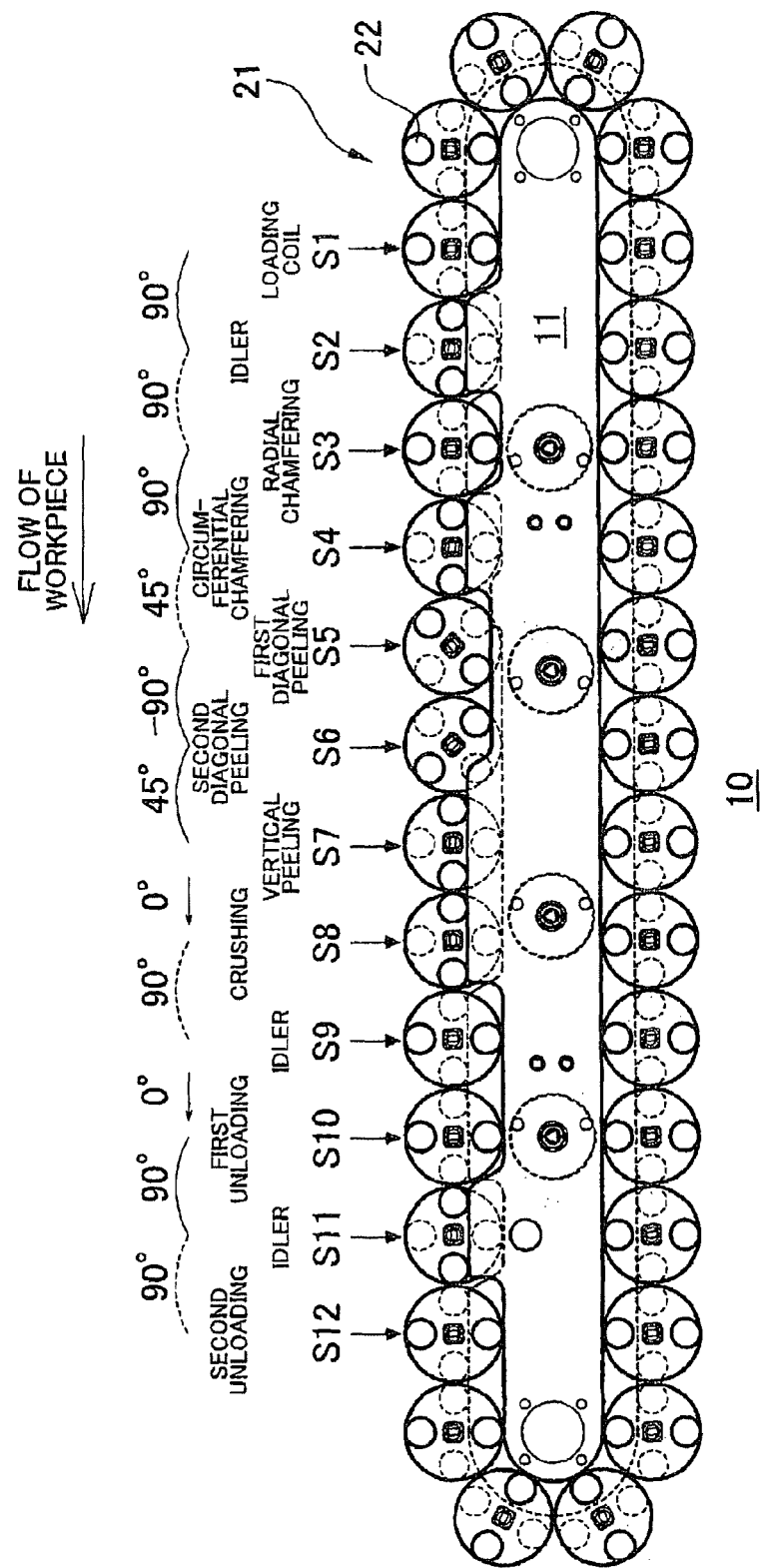
FIG. 15 is a plan view of the first cam plate in the conveying mechanism according to a second embodiment of the present invention.
Figure 16:
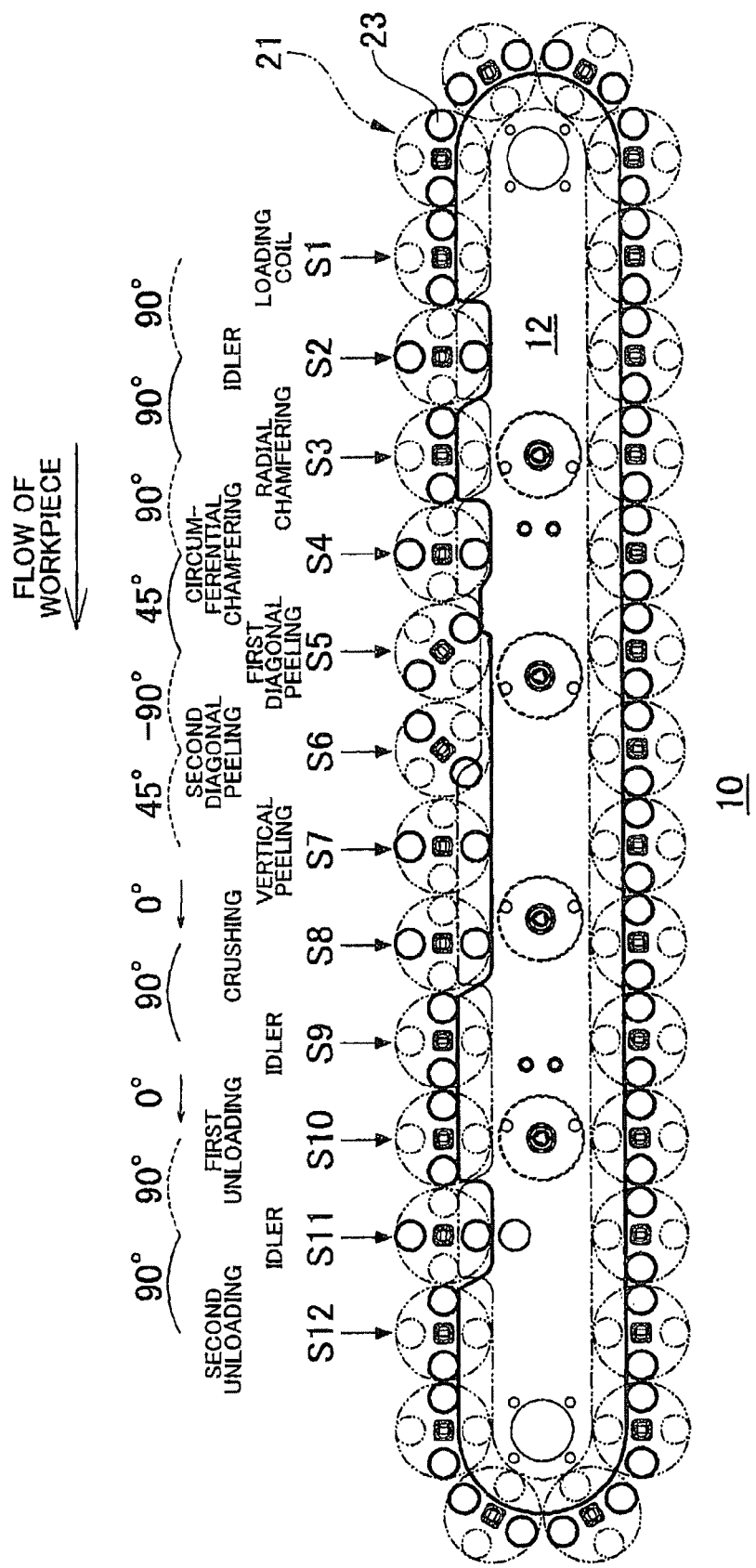
FIG. 16 is a plan view of the second cam plate in the conveying mechanism according to the second embodiment of the present invention.

FIG. 15 is a plan view of the first cam plate 11 in the conveying mechanism 10 according to the second embodiment. FIG. 16 is a plan view of the second cam plate 12 in the conveying mechanism 10. In the loading position S1 shown in FIG. 15 and FIG. 16, the flat wire D that has been cut in the specified length is inserted in the flat-wire holding section 24 from the outside. Then, the first cam plate 11 and the first cam follower 22 are actuated to rotate the coil conveying jig 20 for 90 degrees from the loading position S1 and convey the flat wire D to the idler S2. The second embodiment is the same as the first embodiment in terms of the processes from this position to the vertical peeling position S7, and thus the descriptions of these processes are omitted.

In the vertical peeling position S7, after being cut at the short-side peeling line C3, the flat wire D is conveyed from the vertical peeling position S7 to a crushing position S8 by the coil conveying jig 20 without being rotated. In the crushing position S8, the flat wire D is crushed in a thickness direction. This is performed not for a purpose of changing the thickness of the flat wire D but for a purpose of crushing the burr that is produced when the flat wire D is worked. Then, the first cam plate 11 and the first cam follower 22 are actuated to rotate the coil conveying jig 20 for 90 degrees from the crushing position S8 and convey the flat wire D to an idler S9. The idler S9 is provided for the position arrangement.

In the first unloading section S10, the flat wire D in which the peeled portion D1 has been worked is unloaded from the film peeling device 100. The idler S11 is provided for the position arrangement. In the second unloading section S12, the flat wire D in which the peeled portion D1 has been worked is unloaded from the film peeling device 100. The reason to provide the two unloading sections of the first unloading section S10 and the second unloading section S12 is to allow sorting of the flat wire D by type. In other words, it is designed to provide the two unloading sections because the plural types of the flat wire D have to be worked.

Figure 17:
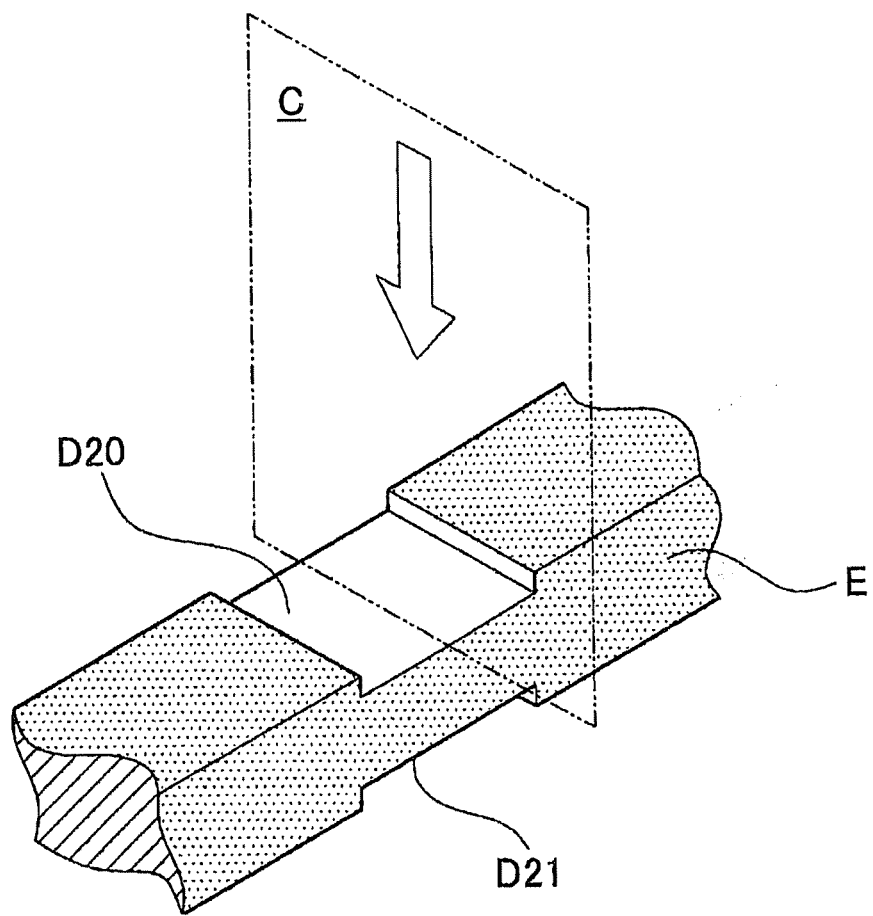
FIG. 17 is a perspective view for showing a cutting state of a wire according to the second embodiment of the present invention.

S8 and S9 of the second embodiment are different from those of the first embodiment, and S8 is set as the crushing position S8 instead of the horizontal peeling position. Also, crushing is performed in a direction to face the first surface D21 in a state where the first surface D21 faces the conveying surface F. S9 is set as the idler S9 instead of the crushing position. These changes are made because the working procedure is changed according to the shape of the supplied flat wire D. FIG. 17 is a perspective view for showing a state where a wire E is cut. In the second embodiment, when the flat wire D is loaded on the loading position S1 of the film peeling device 100, the upper surface D20 and the first surface D21 have already been peeled. This is because, as shown in FIG. 17, the upper surface D20 and the first surface D21 have to be formed when the flat wire D is cut in the specified length by a cutting surface C. Accordingly, a process for cutting the flat wire D in the specified length also needs to include a process for forming the upper surface D20 and the first surface D21. As a forming method, it can be considered to adopt a method such as that shown in FIG. 10 of the first embodiment or another method using a laser beam machine or the like.

A reason why the flat wire D is not peeled horizontally, that is, a reason why the flat wire D is not peeled at the long-side peeling line C4 by the film peeling device 100 in the second embodiment is because the insulating film for coating the peripheries of the wire E and the flat wire D is removed in the process for cutting the flat wire D in the specified length, which is shown in FIG. 17. More specifically, because a resinous material such as enamel is used for the insulating film, an insulating coating material may adhere to the end portion D15 during a working process. Consequently, this may lead to the degraded positioning accuracy or additional working processes, which eventually increases the cost. Accordingly, in consideration of the working accuracy and the cost efficiency, the upper surface D20 and the first surface D21 of the wire E are peeled, and then the flat wire D is cut in the specified length by the cutting surface C. Therefore, less expensive and highly accurate peeling can be expected with the film peeling device 100.

The present invention has been described so far in accordance with the embodiments. However, the present invention is not limited to the above-described embodiments. The present invention can be practiced by partially modifying the configuration thereof without departing from the scope of the present invention. For example, the peeling mechanism 60 uses a die and a punch for working. This configuration was made in view of the space efficiency and the cost efficiency. However, as an alternative means of the peeling mechanism 60, a cutting machine such as the laser beam machine or a shaving machine such as an endmill may be used for working. In addition, although the first embodiment and the second embodiment only describe the peeling of only one side of the flat wire D, the peeled portion D1 may be formed simultaneously on both end portions of the flat wire D.

What is claimed is:

1. A film peeling method for a film-coated flat wire performed by a film peeling device including:
    a rotational holder that can rotationally convey the film-coated flat wire in a perpendicular direction to a rotational axis of the film-coated flat wire;
    a positioning mechanism that positions the film-coated flat wire in a longitudinal direction; and
    a working section that is provided in plural and aligned at specified intervals to peel an end portion of the film-coated flat wire,
    the method comprising:
        cutting the film-coated flat wire to a specified length;
        holding the film-coated flat wire that is cut in the specified length in advance by the rotational holder;

rotationally conveying the film-coated flat wire that is held in the holding step by the rotational holder in the perpendicular direction to the rotational axis of the film-coated flat wire, the film-coated flat wire is perpendicularly conveyed with respect to the longitudinal direction thereof;

positioning the conveyed film-coated flat wire by the positioning mechanism; and peeling the end portion by the working section.

2. The film peeling method for a film-coated flat wire according to claim 1, wherein the rotational holder includes plural rotational holders that are connected annularly to one another.

3. A film peeling method for a film-coated flat wire performed by a film peeling device including:

a rotational holder that can rotationally convey the film-coated flat wire in a perpendicular direction to a rotational axis of the film-coated flat wire;

a positioning mechanism that positions the film-coated flat wire in a longitudinal direction; and a working section that is provided in plural and aligned at specified intervals to peel an end portion of the film-coated flat wire, the method comprising:

cutting the film-coated flat wire to a specified length;

holding the film-coated flat wire that is cut in the specified length in advance by the rotational holder;

rotationally conveying the film-coated flat wire that is held in the holding step by the rotational holder in the perpendicular direction to the rotational axis;

positioning the conveyed film-coated flat wire by the positioning mechanism; and peeling the end portion by the working section, wherein the positioning and the peeling are each performed at least three times, a first surface that includes one side of an outer periphery of a cut surface that is formed when the film-coated flat wire is cut perpendicularly to the longitudinal direction, first positioning includes positioning the first surface at a 45 degree incline relative to a conveyance surface on which the film-coated flat wire is conveyed by the rotational holder, first working includes peeling the end portion of the film-coated flat wire in the working section to form a second surface, second positioning includes positioning by which the first surface is inclined for 45 degrees to the conveyance surface by the rotational holder, second working includes peeling the end portion of the film-coated flat wire in the working section to form a third surface that is perpendicular to the second surface that is formed in the first working, third positioning includes positioning by which a lateral surface of the film-coated flat wire is in parallel with the conveyance surface by the rotational holder, and third working includes peeling the end portion of the film-coated flat wire in the working section to form a fourth surface that is angled at 45 degrees with respect to the second surface and the third surface, wherein the first, second, and third workings are each performed at least three times.

4. The film peeling method of claim 3, the film peeling device further including:

a rotational holder that can rotationally convey the wire in a direction that is perpendicular to a rotational axis of the film-coated flat wire;

a positioning mechanism that positions the film-coated flat wire in a longitudinal direction; and a working section that is provided in plural and aligned at specified intervals to peel an end portion of the film-coated flat wire, the method comprising:

cutting the film-coated flat wire to a specified length;

holding the film-coated flat wire that is cut in the specified length in advance by the rotational holder;

rotationally conveying the film-coated flat wire that is held in the holding step by the rotational holder in the direction that is perpendicular to the rotational axis;

positioning the conveyed film-coated flat wire by the positioning mechanism;

peeling the end portion by the working section, holding the film-coated flat wire by the rotational holder such that the first surface faces the conveyance surface after the third working; and crushing the end portion of the film-coated flat wire in one direction to crush a burr that is produced on the film-coated flat wire by peeling in the working section.

* * * * *